Jan. 18, 1966       R. G. CHAUVEL         3,229,587
          SENSER DEVICE FOR COPYING MACHINE-TOOLS
Filed Sept. 24, 1963                5 Sheets-Sheet 1

Jan. 18, 1966  R. G. CHAUVEL  3,229,587
SENSER DEVICE FOR COPYING MACHINE-TOOLS
Filed Sept. 24, 1963  5 Sheets-Sheet 3

161  163

167  169

171  172

United States Patent Office 3,229,587
Patented Jan. 18, 1966

3,229,587
SENSER DEVICE FOR COPYING MACHINE-TOOLS
Raymond G. Chauvel, Velizy, France, assignor to Societe Anonyme dite Gambin S.A., Viuz-en-Sallaz, France, a company of France
Filed Sept. 24, 1963, Ser. No. 311,157
Claims priority, application France, Oct. 12, 1962, 912,015, Patent 1,349,944
17 Claims. (Cl. 90—62)

This invention relates to copying machine-tools of the type including a senser attachment having a feeler member deflectably mounted therein with its outer end tracingly engageable with a pattern contour to be reproduced or copied by the machine-tool. A pick-off arrangement provided within the senser attachment is arranged to generate signals, usually electric signals, on deflection of the feeler from a reference position due to the feeler departing from its prescribed geometrical relationship with the contour being traced, as by moving away from it or too close towards it, and such signals are used to operate servo-mechanisms controlling the relative path of motion of the tool- and work-carries of the machine-tool whereby to cause the tool to cut a contour in the work reproducing the contour of the pattern being traced.

It is a general object of this invention to provide a senser attachment or device for a copying machine-tool of this general character which will possess a number of advantageous features over senser devices now available, especially in respect to accuracy, reliability, protection against malfunction, as well as simplicity and general efficiency.

One common defect generally present in senser devices of the indicated class is its high liability to damage in cases where the feeler is subjected to a deflection substantially greater than the comparatively very small range of deflections which it is supposed to undergo under normal operating conditions when tracing a pattern contour.

Specifically, in such an event the movable pick-off member of a conventional senser attachment will generally be subjected to a corresponding large deflection, and this will frequently cause series damage to the delicate pick-off components or will at any rate destroy the accurately preset adjustments thereof. It is an object of this invention to overcome this defect and provide a senser device having express provision for the feeler to be deflected by amounts greatly in excess of its normal tracing deflections without adversely affecting any part of the senser device. Specifically, it is an object to provide for an automatic upcoupling between the feeler and movable pick-off part on feeler deflection exceeding a prescribed angular range and for thereafter, retaining said movable pick-off part in a constant deflected position so long as the feeler has not returned into said prescribed range, whereafter the feeler and movable pick-off member are automatically re-coupled again for synchronous movement together.

Further objects include:
An improved universal mounting arrangement for the feeler and movable pick-off member of the senser attachment;
The achievement of a high degree of (two-stage) movement amplification in the senser attachment through the provision of simple and efficient mechanical mounting means;
The damped limitation of feeler deflections greatly in excess of its normal tracing deflections, preferably coupled with the automatic actuation of a safety control expedient;
An improved provision for spring biassing the universally mounted feeler back to its reference position;

A highly effective pick-off arrangement for a universally mounted feeler including means for generating distinctive output signals in all or part of the following conditions: feeler in its reference position; feeler deflected by a normal angular amount in each of a plurality of angularly spaced directions from reference position; and feeler deflected by an excessive amount in any direction.

Other objects will appear. Exemplary embodiments of the invention will now be described, for purpose of illustration but not of limitation, with reference to the accompanying drawings, wherein.

Figure 1:
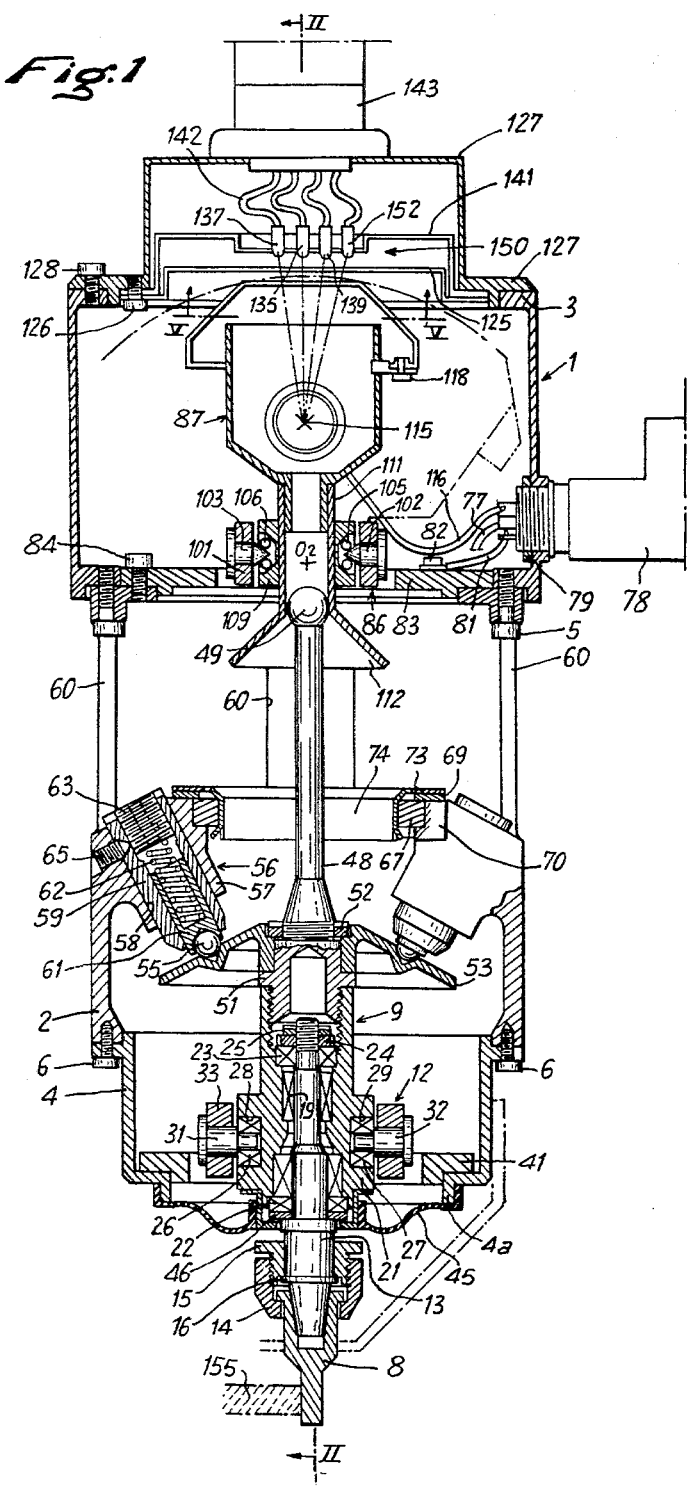
FIG. 1 is an axial section through the improved senser attachment with the feeler in centered or normal position.
Figure 2:
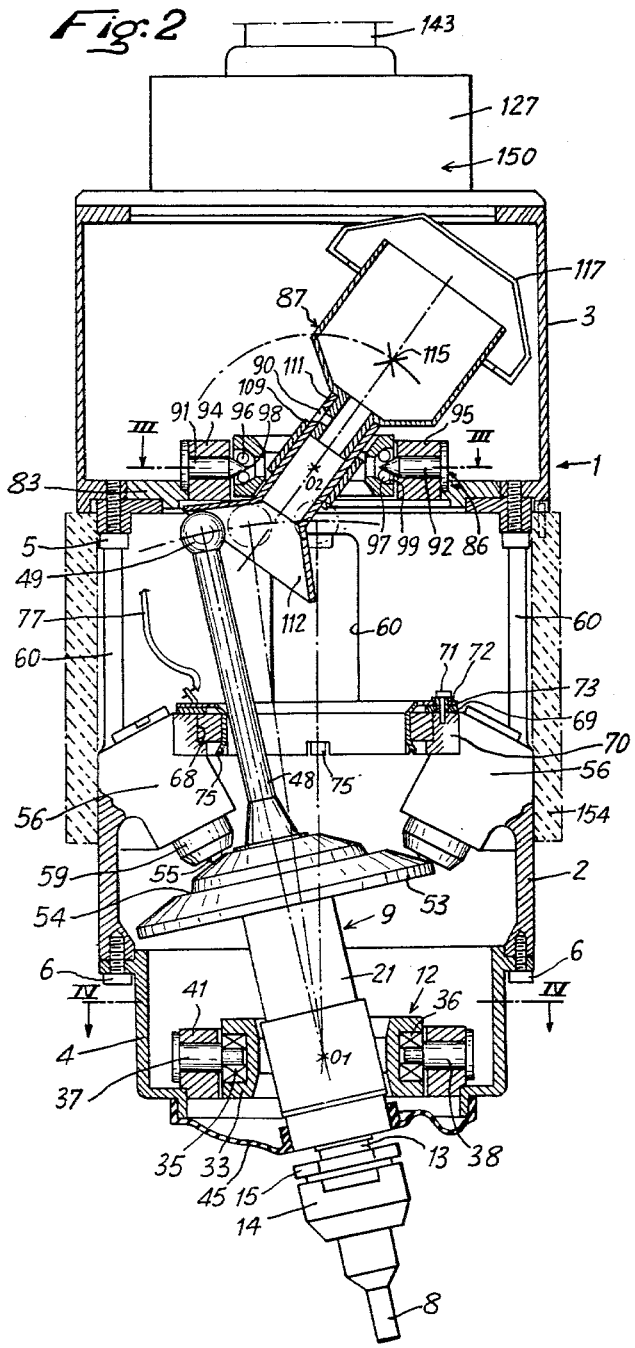
FIG. 2 is a sectional view at right angles to the plane of FIG. 1, on line II—II thereof, and showing the parts as they are positioned when the feeler has been deflected to its maximum angular deflection and the movable pick-off part has accordingly been temporarily uncoupled therefrom.

The copying machine-tool senser unit illustrated in FIGS. 1 and 2 includes a casing or body generally designated 1, which is of generally cylindrical shape and herein is comprised of a plurality of separable sections for convenience in manufacture, assembly and adjustment. Thus, the casing comprises a main body section 2, an upper section 3 and a lower section 4 secured to the main body section as through the screws 5 and 6, respectively.

Figure 4:
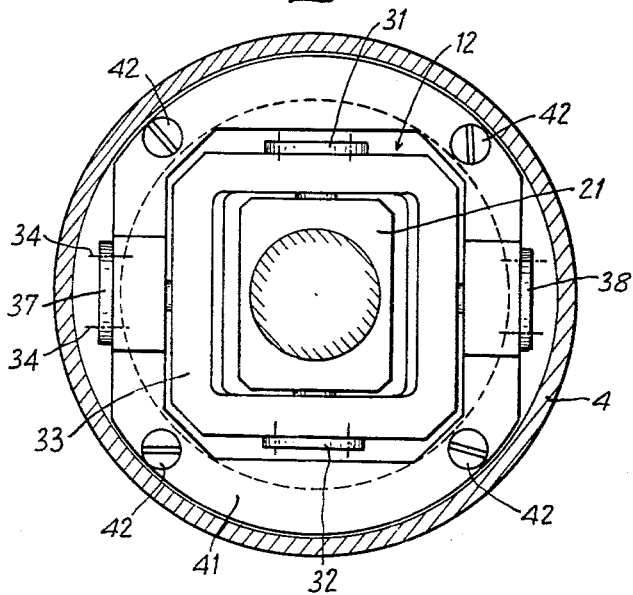

A feeler element 8 projects from the the lower body section 4 and constitutes the end piece of a feeler rod assembly generally designated 9 supported for universal pivotal movement in lower body section 4 about a centre O1 (FIG. 2) by way of a lower universal mounting or Cardan joint 12 (also see FIG. 4). The feeler element 8 has a frustoconical recess in its base adapted to fit over a frustoconical end surface of a shank 13 and is retained thereon by way of an inwardly flanged nut 14 engaging a base flange of the feeler 8 and screwed around an externally threaded bush 15 surrounding the shank 13 and engaging at its outer or lower end a split ring 16 received in an annular groove of shank 13. Shank 13 is supported for rotation about its axis within the inner races of an axially spaced pair of needle bearings 18, 19 the outer races of which are fitted in corresponding recesses of a feeler shank casing 21. Any axial reaction thrusts transmitted to shank 13 in the operation of the feeler are taken up by a spaced pair of thrust bearings 22, 23. The shank 13 is prevented from escaping axially from casing 21 by a retainer nut 24 screwed over the threaded upper end of shank 13 and provided with a block nut 25.

The lower universal supporting means for the feeler shank casing 21 includes a pair of diametrically aligned ball bearings 26, 27 having their outer races fitted in corresponding recesses 28, 29 formed in opposite sides of casing 21 and aligned on a geometric axis normal to the axis of casing 21, a pair of trunnion pivots 31, 32, having their inner ends fitted into the inner races of the respective bearings, an inner gimbal frame 33 of generally rectangular shape having the outer ends of pivots 31, 32 extending through opposite sides thereof, being secured thereto as by means of screws schematically indicated at 34 in FIG. 4, a further pair of ball bearings 35, 36 having their outer races coaxially mounted in the remaining opposite two sides of the gimbal frame 33 being aligned on a geometrical axis normal both to the axis of casing 21 and to the axis of bearings 26, 27, a pair of trunnion pivots 37, 38 having their inner ends engaging the inner races of bearings 35, 36 respectively, and an outer gimbal frame or ring 41 having the outer ends of pivots 37, 38 fitted therein, said outer ring 41 being secured to the lower body section 4 in engagement with an annular base shoulder thereof, by means of screws 42 (FIG. 4).

A flexible protector diaphragm 45, of rubber or the like, has its outer margin secured to an axial end flange 4a of body section 4 and its inner margin secured to the periphery of a cap 46 fitted over casing 21.

The feeler shank casing 21 has an internal screw thread at its upper end with which engages the threaded lower end of extension rod 48 the upper end of which terminates in a ball member 49. Extension rod 48 is provided at its lower end immediately above the screw threaded part thereof with an annular flange 51 which seats against the upper end of casing 21, and seated upon said flange 51 is the lower end of an umbrella-shaped part including a central tubular hub portion seated on flange 51 and a surrounding generally conical (or part-spherical) portion 53. The outer surface of conical portion 53 (see also FIG. 2) is formed with an annular groove 59 V-shaped in cross section, with which are engageable four thrust elements, such as the ball shown at 55, which form part of four respective thrust assemblies that are identical and are generally designated 56. Each thrust assembly 56 includes a tubular boss 57 formed integrally with the body section 2 and having its geometrical axis directed substantially normally to the surface of cone 53 and passing through the centre O1 of the universal joint 12. In a bore 58 of tubular boss 57 is received a sleeve 59 having an eccentric bore therein, in which a plunger 61 is slidably mounted with ball 55 being freely seated in a recess in the outer end of the plunger. A spring 62 has one end engaging the bottom of a recess in the plunger and its other end engaging a screw cap 63 threaded into the upper end of eccentric sleeve 59 to urge the plunger 61 towards the cone 53, so that ball 55 is urged into engagement with the annular groove 54.

Wide apertures 60 are formed in the side wall of body section 2 whereby each of the eccentric sleeves 59 of all four thrust assemblies 56 may be separately adjusted both in axial and in angular position by means of a suitable tool inserted through the related aperture 60 during assembly of the device, and the individual sleeves 59 can then be blocked in their adjusted settings by means of grub screws 65 threaded into the outer side of each thrust assembly and rotatable from outside the casing.

In order to limit the maximum angular amount the feeler assembly 9 is able to deflect in any direction around the geometric centre O1 of Cardan joint 12, there is provided an abutment ring 67 made of natural or synthetic rubber or equivalent damping material inserted into an annular seat 68 formed in a rigid ring member 70 supported from the bosses 57 coaxially with the outer body section 2. The abutment ring 67 is retained in its seat by means of a washer 69 made of electrically insulating material secured over the upper surface of supporting ring 70 with screws 71 and overlapping at its inner periphery the abutment ring 67. A metallic contact member 74 of annular shape includes a thin tubular part engaging the inner periphery of rubber abutment ring 67 and an outwardly extending flange at its upper end. Said flange is spaced a small radial distance from a flat outer contact ring 73 which is perforated and the screws 71 extend through the perforations therein for retaining the contact ring 73 in position. Insulator washers 72 are interposed between the heads of screws 71 and annular contact part 73. The lower end of the tubular part of contact member 74 has lugs 75 stamped out therefrom and bent outwardly to prevent upward displacement of member 74.

Figure 3:
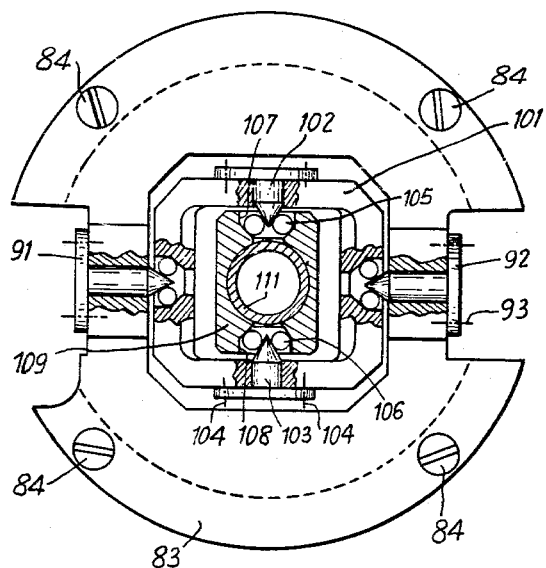
FIGS. 3 and 4 are partial transverse sections on the lines III—III and IV—IV of FIG. 2.

The annular contact part 73 has one end of a supply wire 77 soldered to its upper surface (FIG. 2), the other end of wire 77 being soldered to a terminal projecting from a connector 78 (FIG. 1) secured by way of a nut 79 in an aperture provided in the side wall of upper body section 3. Another terminal of connector 78 is connected to the electrical ground of the apparatus by way of a wire 81 the free end of which has a spade terminal clamped by a screw 82 against a metal plate 83 (also see FIG. 3) secured to main body section 2 with screws 84.

With the arrangement thus described, it will be evident that should the feeler rod assembly 9 be deflected an excessive angle from its centred axial position shown in FIG. 1 for any reason, the rod 48 will first engage the inner surface of annular contact member 74, any impact involved being damped by rubber ring 67. Should the force acting to deflect the feeler rod assembly 9 exceed a determined value, rubber ring 67 is deformed so that the outer rim of the upper flange of contact member 74 engages the inner periphery of contact part 73, thereby completing an electric circuit between wire 77 and the ground connection 81. The circuit thus completed can be used to operate any desired safety expedient not shown, including means for immediately arresting the operation of the machine-tool.

The afore-mentioned plate 83 for universal movement about a centre O2 constitutes the outer gimbal ring of an upper Cardan joint 86 (see FIG. 3) serving to support further a pick-off part generally designated 87. The upper Cardan joint 86 includes a rectangular frame 101 pivoted to outer ring 83 by means of a pair of outer trunnions 91, 92 secured in diametrically aligned relation to outer ring 83 by means of screws schematically indicated at 93 and extending through bosses 94, 95 of ring 83 on a geometric axis normal to the general axis of the feeler assembly, with the inner tips of trunnions 91, 92 being tapered and engaging at opposite sides two sets of bearing balls 96, 97 respectively received in a pair of annular grooves 98, 99 formed in the frame 101. Pivoted within the frame 101 about an axis normal both to the axis of trunnions 92, 93 and to the general axis of the apparatus is a movable pick-off support 109. Support 109 is pivoted in frame 101 by means of a pair of trunnions 102, 103 having their outer ends secured to the related opposite sides of frame 101 with screws schematically indicated at 104 and having their tapered inner ends engaging the two sets of bearing balls 105, 106 received in recesses 107, 108 formed in opposite sides of support 109.

Support 109 is in the form of a generally rectangular block formed with a central bore in which a sleeve 111 is received a tight fit, with the lower end of sleeve 111 projecting below support 109 and being conically flared to provide an inverted funnel 112. Sleeve 111 has an inner diameter corresponding to the outer diameter of spherical ball tip 49 provided at the upper end of feeler rod 48, so as to enable said ball to slide smoothly and without substantial clearance within the sleeve. As indicated in FIG. 1, the parts are so dimensioned that the ball 49 is received in engagement with sleeve 111 around a circumference positioned very close to the lower end of the straight portion of the sleeve.

As can be observed from FIGS. 1 and 2, the system comprising the feeler assembly 9 and sleeve 111 supporting the movable pick-off part 87 at its top, constitutes a movement amplifying leverage, the two components of which are able to rock in all directions about the centres O1 and O2, respectively, of the lower Cardan joint 12 and upper Cardan joint 86. So long as the feeler deflections remain within the angular range corresponding to normal tracing and machining operations, the ball 49 at the upper end of feeler extension rod 48 does not disengage the straight cylindrical portion of sleeve 111, as shown in FIG. 1. However, should the feeler deflection exceed the normal tracing range, as shown in FIG. 2, the ball 49 moves beyond the lower end of the straight part of sleeve 111 and enters the funnel part 112. As soon as ball 49 has cleared the lower end of the straight sleeve part 111 and entered funnel 112, further deflections of the feeler assembly 9 will not result in corresponding further angular movement of the sleeve 111–112 and movable pick-off part 87 carried thereon, since the ball 49 simply slides along an inner generatrix of funnel 112, which generatrix, as will be apparent from FIG. 2, is substantially normal to the axial line of the feeler assembly 9 and rod 48 and hence substantially parallel to the arc described by the centre of ball 49 in its movement around O1 as a centre. Damage to the movable pick-off part 87 is thus prevented, since beyond a determined maximum deflection amplitude of the feeler assembly the movable pick-off part 87 becomes in effect completely uncoupled therefrom and the feeler assembly can continue its angular deflecting movement over a relatively very large additional angular range until it eventually engages the resilient abutment ring 67, and possibly thereafter operates the electrical safety release expedient as earlier described. Throughout this additional range of angular deflections of the feeler assembly the movable pick-off part 87 retains a constant angular position as shown in FIG. 2 in which the delicate pick-off components are not liable to sustain any damage, and their adjustment is preserved.

Turning now to the pick-off arrangement, it will be seen that movable pick-off part 87 is secured as with a screw 90 in the upper end part of sleeve 111, and contains a light source 115 of any suitable type appropriately connected in a supply circuit such as between the ground of the apparatus and a conductor 116 connected to a further terminal of connector 78. Secured over the open upper end of the movable pick-off part 87 with screws 118 is a so-called movable screen 117, formed with a central hole 119 (see FIGS. 5 and 6) and four apertures 121, 122, 123, 124, arranged on two mutually normal diameters of the screen at substantially equal distances from the hole 119. The positional accuracy of the apertures in the screen is not very critical in respect to the proper operation of the system.

Positioned above the movable pick-off part 87 is a stationary opaque screen 125 secured with screws 126 to a cover plate 127 provided over the top of the upper body section 3 and held in position with screws 128. The stationary screen 125 has a central hole 129 which, in the neutral, undeflected condition of the feeler assembly, is aligned with hole 119 in the movable screen so that a light pencil from source 115 is then able to traverse holes 119 and 129. Stationary screen 125 is further formed with four apertures 131, 132, 133, 134 provided on mutually normal diameters directly overlying the diameters on which the apertures 121, 122, 123, 124 are respectively formed in movable screen 117 in the neutral condition of the device, but the apertures 131, 132, 133, 134 are spaced a greater distances from central hole 129 than are apertures 121, 122, 123, 124 from hole 119, so that a light pencil emitted from source 115 and passing through one of the apertures in the movable screen will be able to pass through a corresponding aperture in the stationary screen only if the movable screen has been displaced by a small amount from its neutral or reference position in the direction of the light pencil considered. In other words, every time the feeler assembly is slightly deflected in operation and thereby produces a corresponding, amplified, deflection of the movable pick-off part 87, one aperture, or two adjacent apertures, in the stationary screen 125 are illuminated with a light ray or rays from source 115 which has or have passed through a corresponding aperture or apertures in the movable screen 117.

Photosensitive elements, such as photoelectric cells 135, 136, 137, 138, 139 are fixedly supported directly above the central hole 129 and each of the four side apertures in the stationary screen 125, said photoelements being supported from a plate 141 secured to cover plate 127 with screws 126. The photoelements are connected by way of conductors such as 142 to a multi-terminal connector 143 secured in the top of cover plate 127.

Additional pick-off means are provided for detecting angular deflections of the feeler assembly in excess of the amount of deflection required to energize any one of the four photoelements 136, 137, 138, 139. Inasmuch as the centres of the screens are occupied by the holes 119 and 129 serving to detect the neutral or reference position of the feeler, said additional means are herein provided to a side of the screens, and include a hole 145 formed in stationary screen 125 and four apertures 146, 147, 148, 149 formed in the movable screen 117 and arranged at the apices of a small square as shown, with a solid circular opaque portion 151, overlying the central area of said square and covering equal parts of each of said four last mentioned apertures. An additional photoelectric cell 152 is supported in a suitable position from plate 141. The arrangement is such that when the feeler assembly is either in its reference position or is deflected by a small angle so as to energize one of the four additional apertures 146–149 in the movable screen, any light ray from the source travelling towards the hole 145 in the stationary screen will be intercepted by the solid portion 151 of the movable screen, while otherwise, should the feeler deflection increase beyond such angle, the light ray will be allowed to pass through one of the four apertures 146–149 in the movable screen and thence through hole 145 in the stationary screen to excite the additional photo-cell 152.

Summarizing the photoelectrical pick-off arrangement thus described, there is seen to be provided a first photo-cell 135 for detecting the neutral reference position of the feeler; four photo-cells 136–139 responsive to small angular deflections of the feeler along four radially outward directions; and an additional photo-cell 152 responsive to greater deflection angles of the feeler regardless of the particular direction thereof. The set of photo-cells thus described together with the stationary screen 125 comprise the stationary part 150 of the pick-off system.

Figure 5:
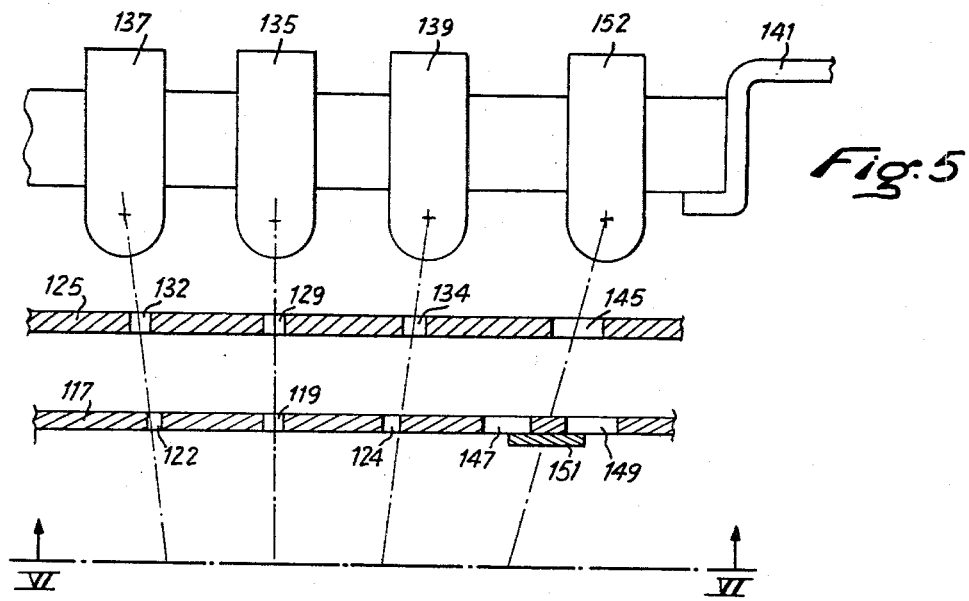
FIG. 5 is a large-scale view in schematic form of the upper part of FIG. 1 showing optical or photoelectrical pick-off means.
Figure 6:
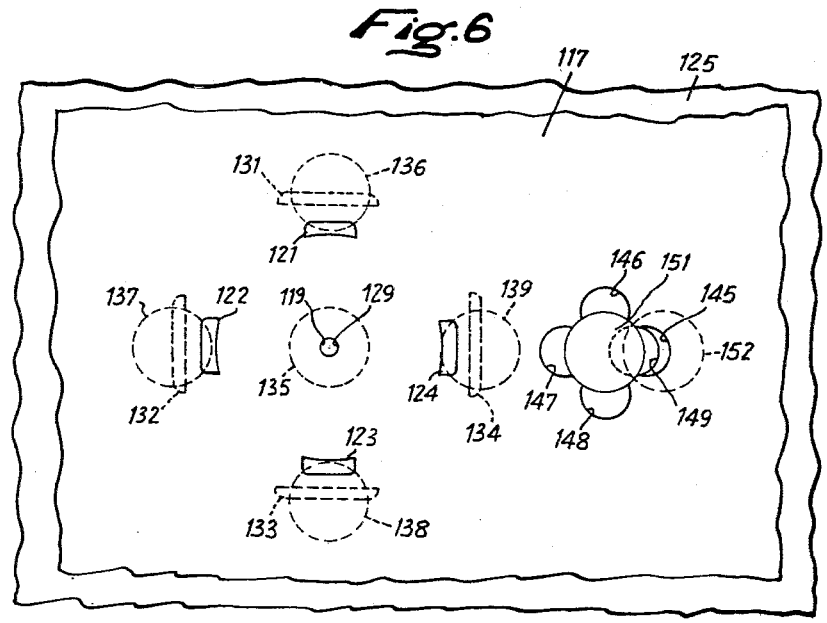
FIG. 6 is a view on line VI—VI of FIG. 5.
Figure 7:
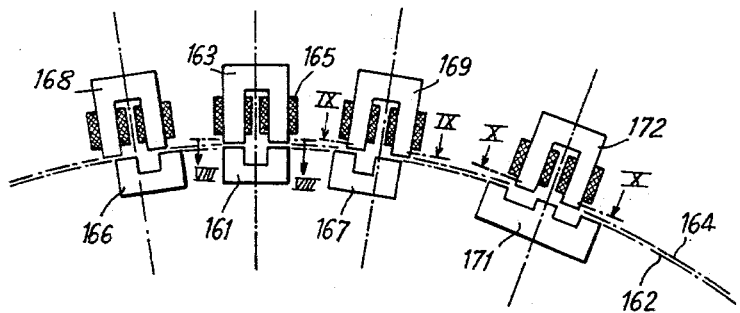
FIG. 7 is a schematic view illustrating an inductive or electromagnetic version of the pick-off means of the invention, being a modification of the optical means shown in FIG. 5.

In FIGS. 5 and 6, the four additional pick-off apertures 146–149 are shown as being round holes partially covered by a circular wafer 151, but this of course is merely a matter of convenience, and said apertures might be directly formed to the crescent shape shown, or to equivalent shapes. In fact, in case the movable screen is made of transparent material made opaque with a suitable coating in all areas other than those in which the afore-mentioned holes and apertures are to be provided, the four apertures 146–149 may suitably be replaced with a continuous annular transparent area.

The over-all operation of the system will now be described.

The feeler casing or body 1 is suitably mounted on the machine-tool as being clamped in a sleeve 154 or the like, and the freely rotatable feeler element 8 is placed in lateral engagement with a pattern contour 155 (FIG. 1). Connector 78 is connected up to provide a suitable electrical supply for the light source 115 and the safety contact ring 73, and connector 143 is also appropriately connected for energizing the photoelectric cells.

Any relative transverse displacement occuring between the body 1 of the feeler device and pattern plate 155 will act through feeler element 8 to cause a tilting or deflection of the feeler assembly 9 about centre O1 in a plane normal to the pattern contour at the point of feeler engagement. This deflection of the feeler induces a corresponding and amplified deflection of sleeve 111 in the opposite sense and in the same plane, and sleeve 111 carries with it the movable pick-off part 87. This deflection of part 87 first results in the light ray from source 115, which in the previous neutral position of the feeler was passing through holes 119 and 129 to central photo-cell 135, now being intercepted by a solid area of stationary screen 125; moreover, at least one of the four side apertures 121–124 of the movable screen is now positioned in line with source 115, a side aperture 131–134 of the stationary screen and a related photo-cell 136–139. The electric signals generated by the photo-cells in response to selective illumination thereof in the manner just described, are used to produce through conventional servo-mechanisms not shown, the requisite relative feed and transverse displacements between the work and tool, and simultaneously restoring the normal reference relationship between the feeler and pattern, whereby the tool will cut the work to a contour corresponding accurately to the pattern contour. The means for producing this result may assume any conventional form and have not been illustrated herein since they form per se no part of the invention.

It will be observed that the deflections of the feeler 8 as produced by the pattern contour are subjected to an initial stage of mechanical amplification in the ratio of the lever-arms of the feeler assembly 9, i.e. the ratio of the distances from centre O1 to ball 49, to the distance from centre O1 to feeler extremity 8; said deflections are next subjected to a further stage of mechanical amplification in the ratio of the lever arms of the movable pick-off part 87, i.e. the ratio of the distance from centre O2 to movable screen 117, to the distance from centre O2 to the lower end of straight sleeve 111. Further amplification is of course provided by the gain of the optical system and the conventional electronic amplifier means, not shown, connected to the output of the photo-cells.

The additional pick-off means including lateral photo-cell 152 which responds to feeler deflections of an amplitude greater than that required to energize the directional photo-cells 136–139 is especially useful in the tracing of certain types of pattern contours such as closed or endless contours and the like.

The system described is extremely reliable and safe to operate for a number of reasons. First, all the delicate components of the pick-off assembly are prevented from damaging contact between the movable pick-off part 87 and stationary pick-off part 150, since the movable screen 117 which is the movable part, having maximum radius about the centre of rotation O2, describes a spherical surface lying completely within all of the stationary pick-off parts including stationary screen 125, photo-cells and attached components. Moreover, in case of excessive angular deflection of the feeler, the feeler assembly 9 becomes temporarily uncoupled from the movable pick-off part 87 as earlier described. Furthermore, such excessive deflections beyond a determined range will result in engagement against the flexible abutment ring 67 and eventually actuate the safety device by way of electric contact ring 73 also as described hereinabove.

The system is simple to construct, robust and operates reliably with minimum maintenance requirements. The rotary mounting of the feeler element 8 ensures that the reaction force against the pattern contour will at all times be applied on a direction extremely close to the geometrical normal to the said contour.

Clearly a great number of modifications may be introduced into the detailed construction shown and described without exceeding the scope of the invention. Besides the modifications referred to above in the optical pick-off system used, and other possible modifications in such optical system, it will be understood that the invention can well be used in conjunction with a pick-off arrangement other than optical in character. Thus, referring to FIGS. 7–10, the entire optical pick-off arrangement described with reference to FIGS. 5 and 6 can be replaced by an inductive pick-off arrangement. This may include as shown a magnetic armature 161 carried by a part 162 which would be substituted for the movable optical pick-off screen 117, the armature 161 performing a function generally corresponding to that of the central optical pick-off hole 119. An electromagnet 163 carried by a part 164 substituted for the stationary optical pick-off screen 125, would correspondingly perform a function analogous to that of the central hole 129, and simultaneously replaces the related photo-electric cell since its output winding 165 will generate an electric signal which can be applied to any suitable control servo-mechanisms as earlier mentioned.

Similarly in this embodiment there may be provided four further magnetic armatures such as the two shown at 166, 167, and arranged on mutually normal directions to opposite sides from the central armature 161, as substitutes for the side apertures 121–124 of the optical pick-off system first described. Four electromagnets such as the two shown at 168, 169 cooperate with said further armatures and represent the apertures 131–134 together with the photo-cells 136–139 of the optical embodiment of FIGS. 5 and 6. The additional pick-off system responsive to large deflections and constituted in the optical pick-off arrangement first described by the photo-cell 152 and associated apertures, is herein provided in the form of an additional magnetic armature 171 and cooperating electromagnet 172.

Figure 8:
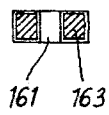
FIGS. 8–10 are partial sectional views on lines VIII—VIII, IX—IX and X—X of FIG. 7, respectively.
Figure 9:
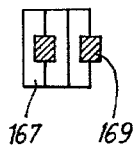
Figure 10:
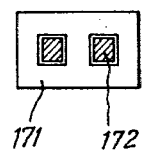

As here shown, the pole pieces of electromagnet 163 are similar in shape and surface area to those of the pole pieces of armature 161 with which they are to cooperate (FIG. 8). The pole pieces of the four armatures such as 167 are greater in circumferential extent about the reference axis than are the pole pieces of the corresponding electromagnets 169 (FIG. 9) in order to make allowance for the spherical swivel motion of the movable pick-off part while retaining the requisite radial sensitivity. The pole pieces of armature 171 extend completely around the pole pieces of electromagnet 172 (FIG. 10) as seen in projection, so that said electromagnet will be energized for feeler deflections greater than a predetermined angle regardless of the direction in which such deflections occur.

The operation of the electromagnetic or inductive pick-off system described with reference to FIGS. 7–10 will be evident from the explanations previously given. The output windings of the electromagnets generate output electrical signals which, after suitable amplification, are applied to servo-mechanisms controlling the various displacements of the machine-tool to cause it to cut a contour on the workpiece similar to the contour of the pattern traced by the feeler.

In a further modification, the pick-off system instead of being photo-electrical or inductive may be capacitive in character. The pick-off elements would then be provided in the form of capacitors each having a fixed electrode secured to the apparatus casing and a movable electrode carried by a member forming part of the movable pick-off part rotatable about the centre O2. This modification has not been illustrated but will be readily understood from the earlier description and in view of the state of the art.

Various further modifications are conceivable. The universal supporting means for the feeler assembly about centre O1 and the movable pick-off part about centre O2, herein shown in the form of Cardan joints, may be provided as spherical swivel joints instead. The lost motion coupling between the upper end of the feeler assembly and the movable pick-off part, may be provided in a form other than the ball member 49 and the inverted conical funnel 112. In certain aspects of the invention, the movable pick-off part 87 may be connected directly with the feeler assembly without providing the dual lever amplification system shown. The feeler element 8 may be integrally secured to the feeler assembly instead of being freely rotatable with respect thereto as shown. The plurality of spring plunger means such as 56 cooperating with the grooved cone member 53 may be replaced by equivalent means for resiliently biassing the swivelled feeler assembly towards its neutral position. Various other modifications may occur to those familiar with the art after studying the present specification and accompanying drawings.

What I claim is:

1. A senser device for a copying machine-tool system comprising a body, a feeler mounted in said body for deflection from a neutral position with respect thereto, and having an outer end part engageable with a contour to be copied, pick-off means in said body including a movable pick-off part mounted in said body for deflection from a neutral position and a stationary pick-off part having output means generating output signals in response to deflection of said movable pick-off part, and means mechanically coupling said feeler and said movable pick-off part and including a lost-motion connection, whereby deflection movements of the feeler within a predetermined range from said reference position produce corresponding deflection movements of the movable pick-off part, while deflection movements of the feeler beyond said range will produce no additional deflection of the movable pick-off part.

2. A senser device for a copying machine-tool system comprising a body, a feeler mounted in said body for universal pivotal movement about a first centre of rotation and having an outer end engageable with a contour to be copied so as to be deflectible thereby from a neutral position with respect to said body, pick-off means in said body including a movable pick-off part mounted for universal pivotal movement about a second centre of rotation and a stationary pick-off part having output means generating output signals in response to relative deflection between said pick-off parts, and means mechanically coupling said feeler and said movable pick-off part including means interengageable to transmit pivotal movement from the former to the latter within a first range of angular deflections of the feeler from said neutral position and automatically disengageable on feeler deflection attaining a second angular range greater than the first range and including means for retaining the movable pick-off part in a constant deflected position throughout said second range of feeler deflections.

3. A senser device as claimed in claim 1, wherein said coupling means comprise elongated portions respectively connected to said feeler and said movable pick-off part, one of said portions having a recessed end and the other portion having an adjacent end engageable into the end recess of said one portion within said first range of deflections and disengageable therefrom in said second range of deflections.

4. A senser device as claimed in claim 2, wherein said coupling means comprise an elongated portion extending from said movable pick-off part towards said feeler and having a recessed free end and an elongated portion extending from said feeler and having a free end engageable into the recess of said one portion within said first range of deflections and disengageable therefrom in said second range of deflections, and said retaining means comprise a funnel-like guide surface extending from the end of said recessed portion and surrounding the end of said other portion and so angled that said other portion will slide along a generatrix of said guide surface within said second range of deflections so as to retain the movable pick-off part in its constant deflected position.

5. The senser device claimed in claim 2, further including a resilient annular abutment member mounted in said body and surrounding said feeler so as resiliently to limit the deflections thereof in said second range to a predetermined maximum value.

6. The senser device claimed in claim 5, including electric contact means actuatable on engagement of the feeler with said annular abutment and connected to actuate a safety control.

7. The senser device claimed in claim 5, including electric contact means actuatable on a predetermined amount of resilient deformation occuring in said abutment member due to engagement thereof by said feeler and connected to operate when actuated a safety control.

8. The senser device claimed in claim 2, including means for resiliently biasing the feeler to said neutral position in the body, said means comprising a generally arcuate annular surface projecting around the feeler and a plurality of spring pressed plunger elements mounted in the body around the feeler and engageable with said surface.

9. The senser device claimed in claim 8, wherein said annular surface has an annular groove therein coaxial with said feeler and engageable by said plunger elements when the feeler is positioned within said first range of angular deflections.

10. The senser device claimed in claim 3, wherein said feeler is mounted in said body for universal pivotal movement about a center of rotation, the effective distance from said center of rotation to said end of the elongated feeler portion being greater than the distance from said center of rotation to the feeler end part engageable with said contour so as to provide for a degree of movement amplification.

11. The senser device claimed in claim 3, wherein said movable pick-off part is mounted in said body for universal pivotal movement about the center of rotation, the effective distance from said center of rotation to the end of the elongated portion of the movable pick-off part engageable with the elongated feeler portion being smaller than the distance from said center of rotation to the opposite end of the movable pick-off part directed toward the stationary pick-off part, to provide for movement amplification.

12. A senser device for a copying machine-tool system comprising a body, a feeler mounted in said body for universal pivotal movement about a first center of rotation and having an outer end engageable with a contour to be copied so as to be deflectable thereby from a neutral position with respect to the body, pick-off means in said body including a movable pick-off part mounted for universal pivotal movement about a second center of rotation in synchronism with the universal movements of the feeler throughout part of the full range of feeler deflection and a stationary pick-off part, and cooperating means on said pick-off parts for generating a related one of four different signals when the movable pick-off part is deflected from a reference position in each of four corresponding directions angularly spaced around said reference position, said cooperating means on said stationary and on said movable pick-off parts being located entirely on the outer side and on the inner side respectively of a theoretical spherical surface the center of which is on said second center of rotation.

13. The senser device claimed in claim 12, further including cooperating means on said pick-off parts for generating a reference signal when the movable pick-off part is in its reference position.

14. The senser device claimed in claim 12, wherein said cooperating means on the pick-off parts comprise predetermined active areas on the respective parts and a plurality of signal generating means on the stationary pick-off part energized on selective alignment of an active area of the movable part with a corresponding area of the stationary part.

15. The senser device claimed in claim 14, wherein the movable pick-off part contains a light source, the signal generating means comprise photo-electric cells, and said active areas comprise transprent area formed in a generally opaque background and alignable to permit selective energization of said photoelectric cells from said source.

16. The senser device claimed in claim 14, wherein said active areas comprise magnetic elements and the signal generating means comprise electromagnetic elements including output windings selectively energizable due to inductive coupling on alignment of said magnetic elements therewith, said magnetic elements and electro magnetic elements having cooperating surfaces facing respectively the faces of said theoretical spherical surface, thus forming a gap of constant thickness and variable effective area.

17. The senser device claimed in claim 14, wherein said active areas comprise capacitor electrodes and the signal generating means comprise electric circuits selectively energizable due to capactitive coupling on alignment of said elecrodes, said capacitor electrodes having cooperating surfaces facing respectively the faces of said theoretical spherical surface, thus forming a gap of constant thickness and variable effective area.

References Cited by the Examiner

UNITED STATES PATENTS

| 2,447,201 | 8/1948 | Miller | 90—62 X |
| 2,868,993 | 1/1959 | Henry | 90—62 X |
| 2,973,695 | 3/1961 | Schmid | 90—62 X |
| 3,122,970 | 3/1964 | Rhoades | 90—62 |

FOREIGN PATENTS

| 832,981 | 6/1943 | France. |
| 951,497 | 10/1949 | France. |

WILLIAM W. DYER, JR., *Primary Examiner.*